United States Patent [19]

Beccu et al.

[11] 3,753,782

[45] Aug. 21, 1973

[54] ELECTRODE FOR ELECTROCHEMICAL REDUCTION OF OXYGEN AND PROCESS FOR ITS PRODUCTION

[75] Inventors: Klaus Beccu, Troinex/GE; Manfred Gutjahr, Carouge/GE; Jack Ambert, Onex/GE; Helmuth Keiser, Vessy, all of Switzerland

[73] Assignee: Battelle Memorial Institute, Carouge/GE, Switzerland

[22] Filed: June 22, 1971

[21] Appl. No.: 155,613

[30] Foreign Application Priority Data
June 23, 1970 Switzerland.......................... 9628/70

[52] U.S. Cl. .......................................... 136/120 FC
[51] Int. Cl. .......................................... H01m 13/00
[58] Field of Search..................... 136/120 FC, 121, 136/122; 75/201, 203, 225

[56] References Cited
UNITED STATES PATENTS

| | | | |
|---|---|---|---|
| 2,342,799 | 2/1944 | Goetzel | 75/203 |
| 3,097,974 | 7/1963 | McEvoy et al. | 136/120 FC |
| 3,226,263 | 12/1965 | Oswin | 136/120 FC |
| 3,549,423 | 12/1970 | Grubb et al. | 136/120 FC |
| 3,207,600 | 9/1965 | Hirai et al. | 75/203 X |
| 3,321,286 | 5/1967 | Clark et al. | 136/120 FC |

FOREIGN PATENTS OR APPLICATIONS

| | | | |
|---|---|---|---|
| 1,377,871 | 9/1964 | France | 75/201 |
| 1,054,247 | 1/1967 | Great Britain | 136/120 FC |
| 1,127,955 | 9/1968 | Great Britain | 136/120 FC |

Primary Examiner—L. Dewayne Rutledge
Assistant Examiner—M. J. Andrews
Attorney—Waters, Roditi, Schwartz & Nissen

[57] ABSTRACT

An electrode for electrochemical reduction of oxygen in an alkaline electrolyte and a process for the production of such electrode, comprising moulding a powder mixture containing as catalyst materials for activating oxygen conversion at least two of the metals nickel, cobalt, iron and manganese and active carbon and sintering the particles of the powder mixture to form an electrode body thereof containing non-stoichiometric mixed carbides.

12 Claims, No Drawings

3,753,782

ELECTRODE FOR ELECTROCHEMICAL REDUCTION OF OXYGEN AND PROCESS FOR ITS PRODUCTION

This invention relates to an electrode for the electrochemical reduction of oxygen and a process for the production of such electrode.

It is known to use for the reduction of oxygen a porous electrode body to which oxygen is continuously fed from the gas side.

It is further known that various catalysts promote electrochemical conversion of oxygen especially at the three-phase limit between electron conductor, oxygen gas and electrolyte. These catalysts permit obtaining technically useful current densities so that such oxygen electrodes provided with a catalyst are being used as the positive electrode in fuel cells with a suitable fuel electrode as the negative electrode. But oxygen electrodes can also be advantageously used as the positive electrode in a voltaic cell in which the negative electrode is formed of an electrode capable of being recharged electrochemically as is common in storage batteries.

As oxygen reduction takes place at a relatively high positive potential the electrode material must be resistant to corrosion by the electrolyte used.

The catalysts best known for electrochemical reduction of oxygen are platinum and silver which are finely distributed in a porous electrode body. Often activated carbon is used as a support material for the catalyst and in many cases such activated carbon is pressed into a metal grid to improve the mechanical strength and the conductivity of the electrode.

For technical use of oxygen electrodes a working life of about 10,000 working hours is required. But even the most efficient known catalysts such as platinum and silver only meet this requirement when they are present in substantial concentrations in the oxygen electrode. This again increases the cost in relation to the electric power produced to the extent of rendering economically disadvantageous the use of oxygen electrodes with such noble metal catalysts for most technical applications in which higher power is required.

Therefore, for oxygen reduction other catalysts have already been proposed which do not contain any noble metal. Thus, for example, recently it has been proposed to use metal chelates such as iron phthalocyanine as catalysts. But they are stable only in an acid environment. Further, their electrocatalytical activity necessitates the presence of a metal support substrate and the best results have been obtained with a gold substrate.

Also mixed oxides such as spinel, chromite, ferrite, cobaltite, manganite, vanadate as well as tungsten bronzes have been proposed as catalysts. Although these substances are relatively inexpensive and also resistant to corrosion their use has not been adopted generally because hitherto it has not been possible to satisfactorily reproduce their electrochemical activity.

It has further been proposed to use as catalyst materials instead of the expensive platinum, the borides, silicides, carbides and/or nitrides of one or more transition metal of the secondary groups IV to VIII of the periodic system of elements. According to this proposal, for the formation of these catalysts an easily vaporizable boron, silicon, carbon and/or nitrogen compound has been caused to react with an easily vaporizable compound of one or more of said transition metals in a reducing atmosphere at a sufficiently high temperature on the surface of a porous electrode body. This method has the drawback that, depending on the composition of the gaseous phase and particularly the local gas concentrations found in the pores of the electrode body, as well as the temperature, the boride, carbide, nitride and/or silicide thus formed has very different compositions. Therefore, the catalytic properties of these compounds cannot be reproduced, either, in a simple and definite manner. Further, only small amounts of catalyst are formed in the pores and only by repeating the production process several times can a sufficient concentration of catalyst on the surface of the pores be obtained.

Moreover, some of the compounds known as catalysts from this proposal cannot be obtained in the manner described as they are not stable at the temperature occurring in their production. This is the case, for example, with the nickel and cobalt carbides which, as is known, decompose into their components nickel and carbon even at 575°F., i.e., far below the temperature of the intended reaction in the gaseous phase.

In practice it has been found necessary to use catalytically effective substances having a very high chemical and physical stability as even a low solubility or slight corrosion of the catalyst in the electrolyte, due to the generally very small amount of catalyst present, will entail an immediate decrease of the electrochemical efficiency of the electrode. However, with the strongly positive potential characteristic for an oxygen electrode, the resistance to corrosion of most pure carbides or nitrides in alkaline electrolytes is not sufficient to obtain a working life useful from a technical point of view. In these compounds the lattice structure is wider than in the pure generally stable metal. This causes a reduction of the activating energy necessary for separating the metal atoms from the crystal lattice and a decrease of the resistance to corrosion.

It is the object of the present invention to provide an electrode free from noble metals for electrochemical oxygen reduction in alkaline electrolytes, which does not have the defects pointed out above and moreover can be produced in a simple and inexpensive manner.

The invention provides an electrode for electrochemical reduction of oxygen in an alkaline electrolyte, comprising a porous electrode body containing a catalyst material for activating oxygen conversion and consisting mainly of a non-stoichiometric mixed carbide, poor in oxygen, of at least two of the metals nickel, cobalt, iron and manganese.

Such non-stoichiometric mixed carbides, i.e., mixtures of carbides of different metals of the group indicated, as well as alloy carbides, i.e., carbides of different alloying phases of these metals, have proved to be particularly efficient for electrochemical oxygen reduction. Moreover, experience has shown that these carbides of two or more of the mentioned metals are very resistant to corrosion in alkaline electrolytes with the high positive potential of the oxygen electrodes and therefore are particularly suitable as catalyst material for oxygen reduction in continuous operation.

Further, such catalyst material can be relatively easily produced at low cost in technically sufficient quantities and reproducible in defined compositions when it is produced by a topochemical reaction which is easy to carry out.

The invention also concerns a process for the production of such an electrode. This process is characterized in that a powder mixture containing at least two of said metals as well as carbon are moulded into an electrode body of the desired shape and that the particles of the mixture are sintered under vacuum or in an inert atmosphere to form a porous sintered electrode body and produce a non-stoichiometric mixed or alloy carbide poor in oxygen by topochemical reaction between the particles of the mixture.

The said metals may be present in the mixture in pure or alloyed form or in the form of a compound, for example, as a metal hydride. The powder mixture also preferably contains from 5 to 10 percent by weight of carbon powder preferably formed of activated carbon having a large BET-surface (about 116 sq.yds/grain). In this respect, activated carbon of vegetable origin is better than other activated carbon, for example, such of animal origin.

The use of an aqueous suspension of the powder mixture together with a thickening agent, for example methylcellulose, has proved particularly suitable for the preparation of the powder mixture before sintering and its moulding into the desired shape of an electrode body.

The said topochemical reaction between the particles of the powder mixture essentially consists in a physical solution of the carbon on the surface of the metal or alloy particles. As will be explained hereinafter, the conditions of sintering and subsequent cooling affect the catalytic properties of the electrode.

To achieve a long working life of the electrode it is important to provide efficient hydrophobic qualities on the gas side. In the process according to the invention this can preferably, be accomplished by the application of an appropriate organic hydrophobic base layer and subsequent application under pressure of a porous hydrophobic membrane. It has been found that the adhesion of this hydrophobic base layer on the catalyst according to the invention is particularly good. By heating the electrode body almost up to the melting point of the organic substance the adhesion of the hydrophobic base layer on the electrode material can be increased. Thus simultaneously a tempering takes place which increases the activity of the catalyst and its resistance to corrosion. Thus a double effect is obtained by this heating of the electrode body in the application of the hydrophobic base layer so that this step is of particular advantage for the production of highly active and very durable oxygen electrodes.

In the conventional carbide electrodes for oxygen conversion, catalytic activity is mainly due to defects in the lattice structure caused by gas reaction or sintering in the electrode production. However, with the non-stoichiometric mixed or alloy carbides provided according to the invention such lattice defects are of little importance and may be undesirable. In fact, here the catalytic properties are due mainly to the particular configuration of the electrons of the non-stoichiometric mixed or alloy carbides. As a matter of fact, in cooling of the electrode body after sintering, lattice defects may be eliminated by tempering. Simultaneously the inner surface area of the catalyst decreases as has been confirmed by measurements carried out according to the known BET-method. Such elimination of lattice defects by tempering also produces an increased resistance of the carbides to corrosion.

The non-stoichiometric mixed or alloy carbides provided according to the invention may be represented by the following formula:

$$(M_a, M_b)_3(C)_y$$

wherein $M_a$ is a relatively stable base metal of said metals, for example, nickel;

$M_b$ is a supplementary one of said metals, whose share in the mixture is such that $M_a$ still determines the lattice structure, and $y$ may be present in an amount between 0.4 and 0.9 to ensure that understoichiometric mixed or alloy carbides are obtained.

Because of the relatively low carbon content of the understoichiometric mixed or alloy carbides there is less lattice widening and thus the structure of the catalyst is more similar to that of the stable base metal ($M_A$), for example nickel. Further, the production process of the invention leaves the catalyst with a very low oxygen content with a corresponding improvement of the catalytic properties of the catalyst.

The catalytic activity of the electrode produced according to the invention substantially corresponds to that of conventional electrodes having platinum as a catalyst. The tempering of the catalyst in the course of cooling after sintering, which is carried out at temperatures at which the carbides of said metals do not yet decompose (575°F.), has proved to be particularly advantageous for the activity and resistance of the catalyst to corrosion.

It is to be understood that the electrode body apart from the above-mentioned metals may also contain other supplementary metals such as copper.

If desired, nitrogen may also be present in small amounts in the non-stoichiometric mixed or alloy carbide in addition to carbon.

The invention will now be described in greater detail with reference to the following examples showing how it may be carried out.

EXAMPLE 1

8 parts by weight of nickel powder with a medium grain size of about 0.118 mils are mixed with 5 parts by weight of cobalt powder with a medium grain size of about 0.118 mils and with 1 part by weight of carbon powder formed of activated carbon of vegetable origin with a BET-surface of more than 128 sq.yds./grain and a medium grain size of about 0.393 mils. The mixture is worked with 50 parts by weight of water, containing 1 part by weight of methylcellulose, into a homogeneous suspension which is uniformly sprayed with a spray gun onto the two sides of a support of fine nickel fabric the meshes of which have a width of 3.031 mils. In spraying the support is heated by means of a heated bed to 230° ± 9°F. so that the water will immediately vaporize when the suspension hits the support.

When about 8.4 grains of dry material have been applied to the support per square inch of outside surface of the electrode, the resulting crude electrode body is subjected to sintering for 1 hour at 1634°F. in an argon atmoshphere to decompose the methylcellulose and then the electrode body is cooled.

A topochemical reaction takes place between the nickel or cobalt particles, on the one hand, and the carbon powder particles, on the other hand, to form a mixed carbide. In this manner an electrode body in the form of a porous sintered body is obtained which contains the catalyst material in the form of a mixed carbide of nickel and cobalt of a predetermined composition with the mixed carbide uniformly distributed over the entire electrode structure.

Subsequently the sintered electrode body is rendered hydrophobic or water-repellent on one side by spraying with a suspension of polytetrafluoroethylene particles (Teflon), for example, a commercially available 30 N Teflon suspension produced by Du Pont de Nemours. During the spraying operation the sintered body is placed on a heated support so that the liquid phase of the suspension will vaporize on hitting the electrode body. Then to the side of the electrode rendered hydrophobic a thin porous membrane of commercially available Teflon having a medium pore diameter of 0.393 mils and a predetermined porosity of about 70 percent is applied under a pressure of 4580 lbs./sq.in. Finally, by sintering at 626°F. under vacuum or a protective gas the applied Teflon is secured to the electrode body.

Polarization measurements effected on this electrode according to the known half-cell method in a 30 percent potassium hydroxide solution at 77°F. and 0.01 atm. (0.142 lbs./sq.in.) above atmospheric pressure have produced the following results:

| Potential against Hg/HgO (in volts) | Current density (in mA/sg.in.) |
|---|---|
| −0.10 | 325 |
| −0.135 | 900 |
| −0.150 | 1430 |

This electrode can be used for a very long time as an air oxygen electrode at a very low pressure above atmospheric of about 0.07 lbs./sq.in. If the air is kept free from $CO_2$ in the conventional manner, a working life of more than 8000 hours can be attained.

EXAMPLE 2

18 parts by weight of nickel powder (medium grain size 0.118 mils), 12 parts by weight of cobalt powder (medium grain size 0.118 mils), and two parts by weight of activated carbon powder (medium grain size 0.393 mils) are mixed with 80 parts by weight of water containing 2 parts by weight of methylcellulose to prepare a suspension which, as described in Example 1, is sprayed uniformly on the two sides of a heated fine mesh nickel fabric. The resulting blank is subsequently sintered for 30 minutes in an argon atmosphere at a sintering temperature of 1544°F. ± 18°F. After sintering the electrode is rendered hydrophobic as described above. The results of measurements effected during operation as an air oxygen electrode were substantially the same as in Example 1.

EXAMPLE 3

15 parts by weight of nickel powder (medium grain size about 0.118 mils) are mixed with 5 parts by weight of cobalt powder (medium grain size 0.118 mils) and with 1 part by weight of carbon powder of the type used in Example 1.

As described in Example 1, this mixture is then worked into a sprayable suspension and applied to a heated fine mesh nickel fabric. By sintering at 1778°F. in argon for 1 hour and subsequent cooling a sintered electrode body is obtained which contains as a catalyst an understoichiometric mixed carbide of nickel and cobalt with a carbon deficiency of about 23 percent. The further treatment of the electrode body (to render it hydrophobic) is the same as described in Example 1.

The resulting electrode in operation as an air oxygen electrode under the same conditions as set forth in Example 1 has about the same dependence of the polarization on current density.

EXAMPLE 4

A powder mixture formed of 12 parts by weight of nickel powder (medium grain size 0.118 mils), 3 parts by weight of manganese powder (medium grain size 0.118 mils) and 1 part by weight of activated carbon powder are worked into a crude electrode body as described in Example 1 using a fine mesh fabric (mesh width 3.15 mils) of stainless steel as a support.

Then the electrode body is sintered under vacuum for 30 minutes at 1652°F. and subsequently cooled to produce within the electrode body an electrochemically active understoichiometric mixed carbide of manganese and nickel. After sintering the electrode body is rendered hydrophobic as described in Example 1 and the hydrophobic electrode body in operation as an air oxygen electrode provides measurement results similar to those in Example 1.

The aforedescribed use of a metal fabric as a support for the electrode material is of advantage as this both facilitates the production of the electrode and imparts increased mechanical strength and electronic conductivity to the finished electrode.

Instead of polytetrafluoroethylene other hydrophobic hydrocarbons may also be used. Thus, for example, polyethylene of medium chain length is particularly suitable for rendering the electrode hydrophobic.

The invention may be embodied in other specific forms without departing from the spirit or essential characteristics thereof; The present embodiments are therefore to be considered in all respects as illustrative and not restrictive.

We claim:

1. An electrode for electrochemical reduction of oxygen in an alkaline electrolyte, comprising a porous electrode body containing a catalyst material for activating oxygen conversion consisting essentially of a non-stoichiometric mixed carbide having the formula $(M_a, M_b)_3(C)_y$ wherein $M_a$ is nickel $M_b$ is at least one metal selected from the group consisting of cobalt, iron and manganese $y$ has a value of 0.4 to 0.9 and wherein the proportion of $M_a$ and $M_b$ is chosen such that $M_a$ determines the lattice structure.

2. An electrode as claimed in claim 1, wherein said mixed carbide is an alloy carbide.

3. An electrode as claimed in claim 1, wherein said catalyst material has a carbon content of up to 10 percent by weight.

4. An electrode as claimed in claim 1, wherein the porous electrode body is provided on its gas side with at least one hydrophobic layer.

5. An electrode as claimed in claim 4, wherein the hydrophobic layer consists of polytetrafluoroethylene.

6. An electrode as claimed in claim 1, wherein the porous electrode body is a sintered body.

7. An electrode as claimed in claim 1, wherein an electronically conductive support structure is arranged at least partially within the porous electrode body.

8. A process for the production of oxygen electrodes comprising a porous sintered electrode body containing a catalyst for the electrochemical reduction of oxygen in an alkaline electrolyte, said process comprising the steps of:

preparing a powder mixture comprising at most 10 percent by weight of active carbon and at least two metals selected from the group consisting of nickel, cobalt, iron and manganese, the amount of carbon in said mixture being chosen so as to allow formation of a non-stoichiometric mixed carbide of at least said two metals;

forming a liquid suspension of said powder mixture and spraying said suspension onto a metallic support structure so as to deposit thereon a given amount of said mixture;

forming said sintered electrode body by subjecting the mixture deposited on said support to sintering under vacuum or an inert gas atmosphere, with subsequent cooling, so as to produce a topochemical reaction between the particles of the deposited powder mixture and to transform said mixture into said catalyst in the form of a non-stoichiometric mixed carbide of at least two of said metals, said carbide forming a major part of said sintered electrode body.

9. The process of claim 8 comprising the step of tempering said catalyst after said sintering step in a protective atmosphere at a temperature within the upper region of existence of the mixed carbide.

10. The process of claim 9, comprising the steps of applying a porous hydrophobic layer by spraying on to the gas side of said electrode body, applying under pressure a porous hydrophobic membrane to said layer and heating in such manner as to simultaneously provide sintering of said layer and membrane to said electrode body and said tempering of the catalyst.

11. The process of claim 8, wherein the powder mixture has a composition in parts by weight of from about 45 percent to about 75 percent of nickel, about 20 to 50 percent of cobalt and about 5 to 10 percent of active carbon.

12. The process of claim 8, wherein the powder mixture has a composition in parts by weight of about 75 percent of nickel, 19 percent of manganese and 6 percent of active carbon.

* * * * *